United States Patent
Kobayashi (10) Patent No.: US 7,315,587 B2
(45) Date of Patent: Jan. 1, 2008

(54) DEMODULATION METHOD AND APPARATUS BASED ON DIFFERENTIAL DETECTION SYSTEM FOR π/4 SHIFTED QPSK MODULATED WAVE

(75) Inventor: Takehiko Kobayashi, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 658 days.

(21) Appl. No.: 10/743,731

(22) Filed: Dec. 24, 2003

(65) Prior Publication Data

US 2004/0136475 A1    Jul. 15, 2004

(30) Foreign Application Priority Data

Dec. 26, 2002  (JP)  ............................. 2002-376733

(51) Int. Cl.
  *H03D 3/22* (2006.01)
(52) U.S. Cl. ...................... 375/331; 329/304; 375/329; 375/330; 375/324; 375/279; 375/346
(58) Field of Classification Search ................. 375/330
  See application file for complete search history.

(56) References Cited

U.S. PATENT DOCUMENTS

| | | | | |
|---|---|---|---|---|
| 4,796,279 A | * | 1/1989 | Betts et al. .................. 375/229 |
| 5,430,731 A | * | 7/1995 | Umemoto et al. .......... 370/337 |
| 5,537,434 A | * | 7/1996 | Persson et al. .............. 375/134 |
| 5,588,027 A | * | 12/1996 | Lim ............................ 375/330 |
| 6,084,926 A | * | 7/2000 | Zak et al. .................... 375/341 |
| 6,381,288 B1 | * | 4/2002 | He et al. ..................... 375/330 |
| 6,836,518 B1 | * | 12/2004 | Sano et al. .................. 375/343 |
| 6,959,051 B2 | * | 10/2005 | Akahori ....................... 375/340 |
| 2002/0034215 A1 | * | 3/2002 | Inoue et al. ................. 375/147 |
| 2002/0034266 A1 | * | 3/2002 | Akahori ....................... 375/331 |

FOREIGN PATENT DOCUMENTS

JP            09130442            5/1997

* cited by examiner

*Primary Examiner*—David C. Payne
*Assistant Examiner*—Leon-Viet Q Nguyen
(74) *Attorney, Agent, or Firm*—Mattingly, Stanger, Malur & Brundidge, P.C.

(57) ABSTRACT

A demodulator of a differential detection system for a π/4 shifted QPSK or DQPSK modulation wave in digital communication. The demodulator includes a differential detector connected to receive orthogonal components of the modulation wave, a corrector connected to receive an output of the differential detector for correcting a deviated distribution of signal points on a constellation, and a slicer/decoder connected to receive an output of the corrector. The slicer/decoder decodes a received bit from the signal points after the deviated distribution is corrected. The corrector has average calculators connected to receive respective outputs of the differential detector, and subtractors connected to receive the associated outputs of the differential detector and also to receive associated outputs of the average calculators for subtracting an average value of the outputs of the differential detector from the outputs of the differential detector.

4 Claims, 10 Drawing Sheets

DEMODULATION METHOD AND APPARATUS BASED ON DIFFERENTIAL DETECTION SYSTEM FOR π/4 SHIFTED QPSK MODULATED WAVE

BACKGROUND OF THE INVENTION

The present invention relates to a demodulation system for use in digital communication and more particular, to a demodulation method based on π/4 shifted QPSK (π/4 shifted Quadrature Phase Shift Keying) modulation system or π/4 DQPSK (π/4 Differential Quadrature Phase Shift Keying) modulation system in digital communication and also to a demodulator therefor.

As a modulation system for use in digital communication, the π/4 shifted QPSK modulation is one of typical systems. The π/4 shifted QPSK modulation is a common system, in particular, in mobile communication. This is because, as one of its reasons, differential detection having an excellent resistance to propagation environmental fluctuations can be applied in its demodulation system. In this connection, the π/4 shifted quadrature phase shift keying modulation system is referred to also as the π/4 DQPSK modulation system. Thus these systems will be called π/4 shifted QPSK modulation or demodulation system, hereinafter for the sake of convenience of explanation.

JP-A-9-130442 entitled "π/4 shifted QPSK demodulator" discloses a demodulation system in a digital wireless receiver of a π/4 shifted QPSK demodulation system, which can compensate for a waveform distortion generated in a radio wave propagation link and can obtain a high quality of transmission. The prior art demodulator disclosed therein includes a synchronization detection circuit, a waveform equalizer and a differential demodulator, wherein the wave equalizer extracts a signal subjected to wave distortion compensation from an output of the synchronization detection circuit, and the compensated signal is differentially demodulated to obtain decoded data. With such an arrangement, the influences of the waveform distortion generated in the radio wave propagation link can be lightened and thus there can be realized a demodulation system which is excellent even in a signal-to-noise characteristic. However, similarly to other modulation systems, the π/4 shifted QPSK demodulator also requires use of a waveform equalizer having a very large hardware/software scale.

As has been explained above, the π/4 shifted QPSK modulation system is suitable for mobile communication. Similarly to other digital modulation systems, however, when there is a delay spread due to multiple propagation, intersymbol interference takes place, remarkably deteriorating its communication quality. The delay spread will be explained below.

Figure 5:
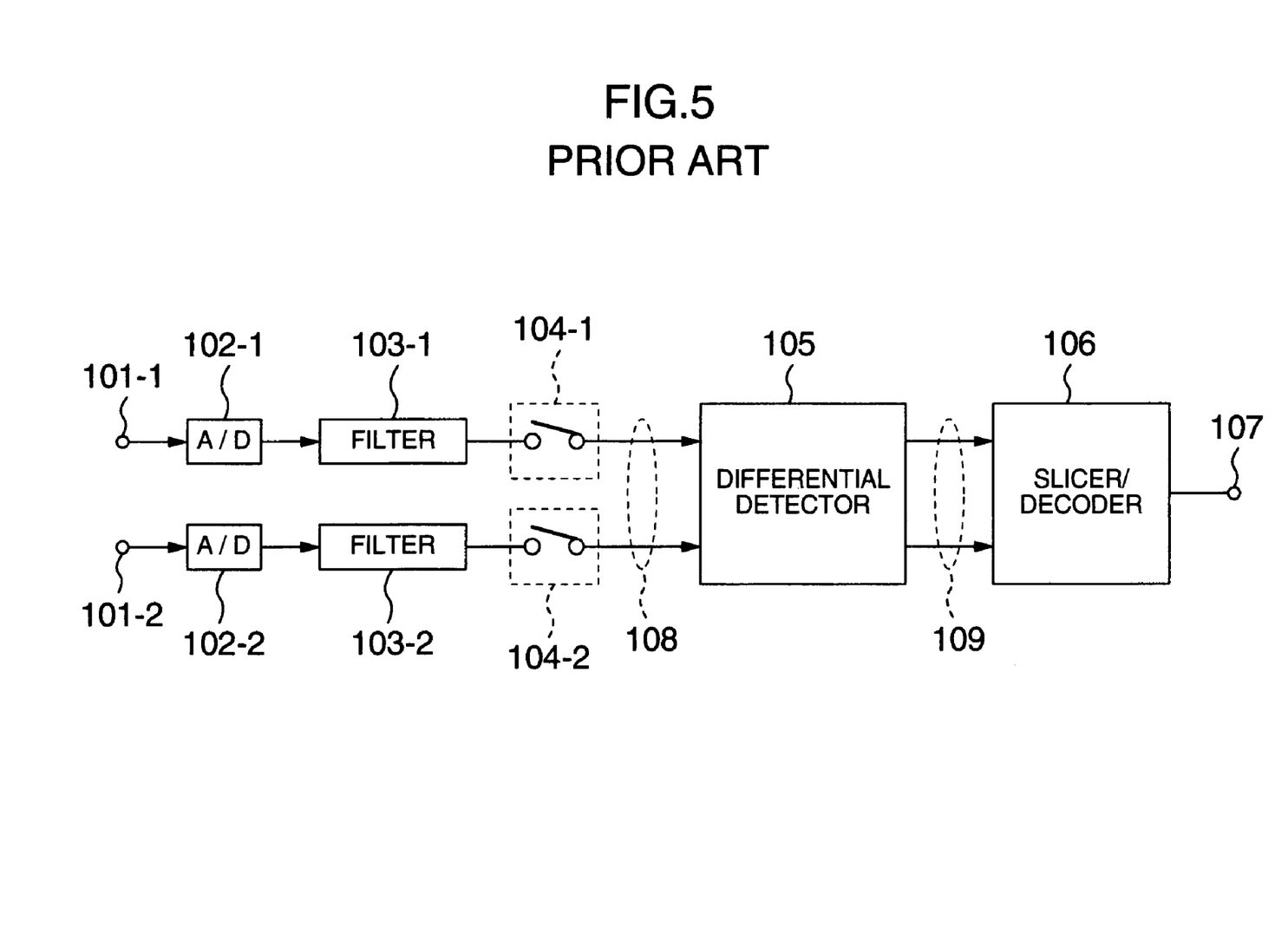
FIG. 5 is a block diagram showing a structure of a prior art π/4 shifted QPSK demodulator.

FIG. 5 is an exemplary structure of a general prior art π/4 shifted QPSK demodulator. In FIG. 5, reference symbols 101-1 and 101-2 denote input terminals for input of a received signal, symbols 102-1 and 102-2 denote A/D converters, 103-1 and 103-2 denote filters, 104-1 and 104-2 denote samplers, 105 denotes a differential detector, 106 denotes a slicer (decider)/decoder, and 107 denotes an output terminal for output of a decoded signal. An I (in-phase) component and a Q (quadrature) component of a base-band converted received signal which is an input signal of the demodulator is converted at each of the A/D converters 102-1 and 102-2 are converted by the A/D converters 102-1 and 102-2 to respective digital signals. Thereafter, the digital signals are subjected at the filters 103-1 and 103-2 to removing operation of unnecessary components and to waveform shaping operation, and then subjected at the samplers 104-1 and 104-2 to extracting operation at symbol points to obtain symbol signals. The symbol signals are subjected at the differential detector 105 to differential detecting operation, symbol-decided at the slicer/decoder 106, converted to corresponding decoded bits, and then outputted from the output terminal 107.

Figure 6:
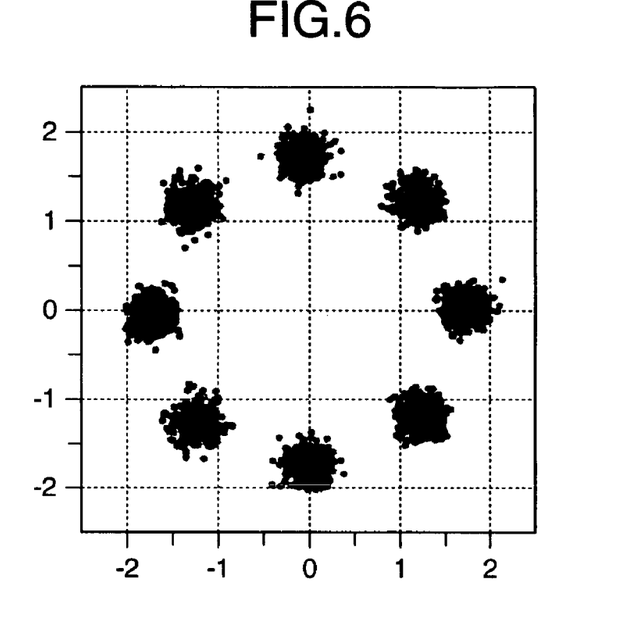
FIG. 6 is a constellation showing exemplary input signals of a differential detector.
Figure 7:
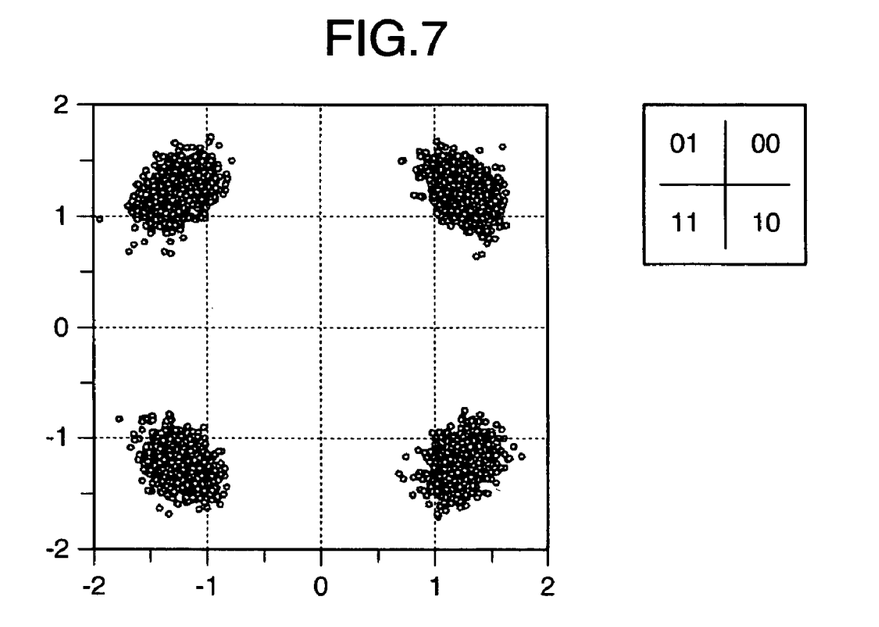
FIG. 7 is a constellation showing exemplary output signals of the differential detector.

Examples of waveforms of signals 108 and 109 in FIG. 5 are shown in FIGS. 6 and 7. In these examples, it is assumed that each received signal has a C/N (carrier to noise ratio) of 15 dB. FIG. 6 shows a differential detected input signal, in which an assembly or aggregation of 8 point symbols can be confirmed. FIG. 7 shows a corresponding differential detected output in which an assembly of four symbol points can be confirmed. Symbol decision is carried out based on each symbol is present in which one of four quadrants defined by real and imaginary axes on a complex plane, and the corresponding decoded bit is outputted. In this example, there is no bit error.

Figure 8:
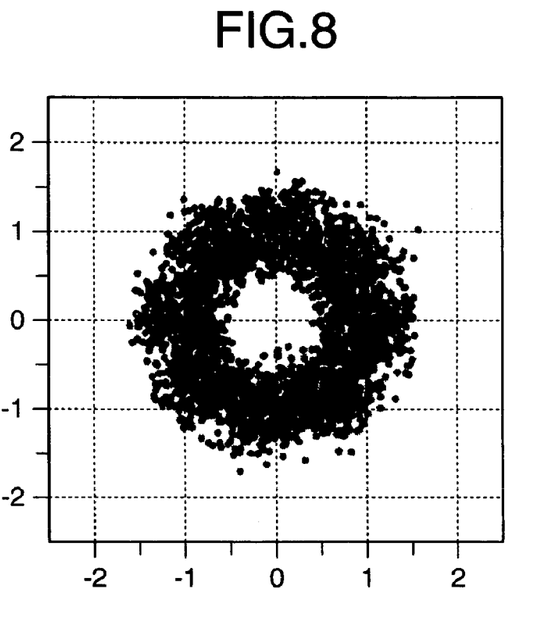
FIG. 8 is a constellation showing an exemplary input signal of the differential detector when a delay spread is present.
Figure 9:
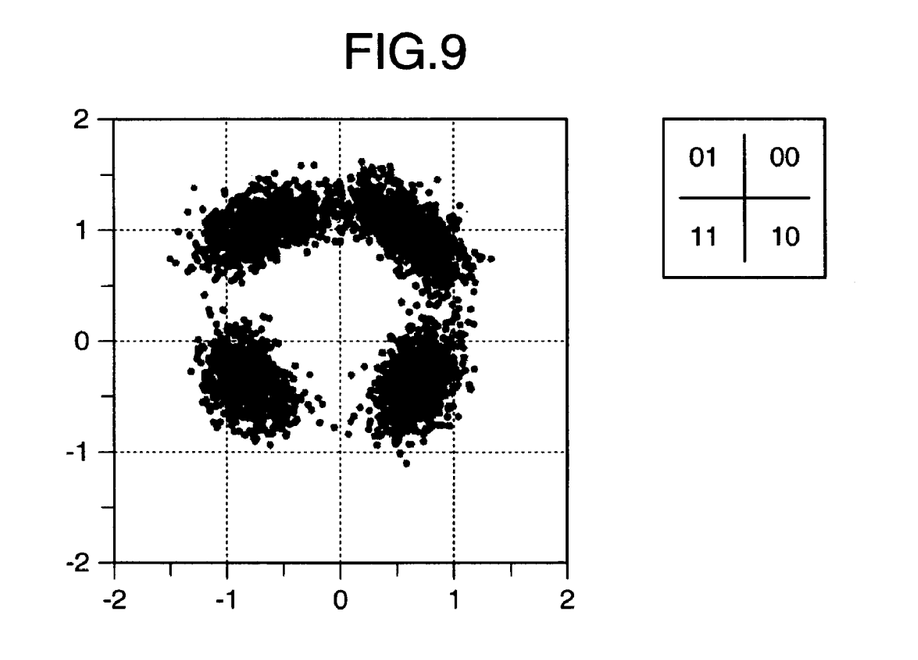
FIG. 9 is a constellation showing an exemplary output signal of the differential detector when a delay spread is present.

Next shown is an example wherein multiple propagation causes a delay spread. The example is a two-wave model as one example wherein a received signal contains a direct wave and a delayed wave component having a power ratio of −3 dB relative to the direct wave and a phase difference of 135 degrees and delayed by ¼ of a symbol time from the direct wave. FIG. 8 shows a differential-detected input signal in this model. It is difficult to identify a clear symbol assembly due to intersymbol interference caused by the delayed wave. FIG. 9 is a differential-detected output. From comparison of a waveform of FIG. 9 with a waveform of FIG. 7, it will be seen that a signal which goes beyond real and imaginary axes on a complex plane forming decision boundaries is present, thus generating a symbol error. In this example, a bit error rate is $2.0 \times 10^{-2}$.

As in the example explained above, the delay spread causes deterioration of a communication quality. One of causes of the delay spread is multiple propagation of radio wave by reflections such as buildings or mountains. As one of methods for lightening the influence of the multiple propagation, it is conceivable to use an adaptive equalizer. Such adaptive equalizers include a linear equalizer, a decision feedback equalizer and a maximum likelihood sequence estimator (or a Viterbi equalizer as a derivative thereof). However, any of these equalizers requires complicated calculation, which results in that its hardware or software scale becomes very large.

As has been mentioned above, the prior art has problems which follow.

(1) In the presence of a delay spread, this causes a communication quality to be deteriorated.

(2) For the purpose of lightening the influence of the delay spread, an adaptive equalizer is required, which involves complicated calculation.

In particular, when an adaptive equalizer is employed for a delay spread as small as it causes somewhat deterioration of the communication quality, it is not necessarily suitable in many cases when consideration is paid to its cost or hardware size increased by the employment of the adaptive equalizer. Accordingly, for such a small delay spread, it is desirable to use a method for lightening the influence in a simple manner.

SUMMARY OF THE INVENTION

In accordance with an aspect of the present invention, there is provided a demodulator of a differential detection system for π/4 shifted QPSK modulated wave. The demodulator includes differential detectors each connected to receive an orthogonal component of the modulated wave;

a corrector connected to receive outputs of the differential detectors for correcting a deviated distribution of signal points on a constellation; and a slicer/decoder connected to receive outputs of the corrector, wherein, the slicer/decoder decodes a received bit from the signal points whose deviated distribution is corrected.

In an embodiment, the corrector is arranged such that average calculators and subtractors are provided between the differential detectors and slicer/decoder to find an average value of outputs of each differential detector, to subtract the average value from the output of the differential detector, and to use the subtracted value as an input of the slicer/decoder.

Other objects, features and advantages of the invention will become apparent from the following description of the embodiments of the invention taken in conjunction with the accompanying drawings.

DESCRIPTION OF THE EMBODIMENTS

Embodiments of the present invention will be explained with reference to the attached drawings. In the drawings, members having the same functions are denoted by the same reference numerals or symbols.

Figure 1:
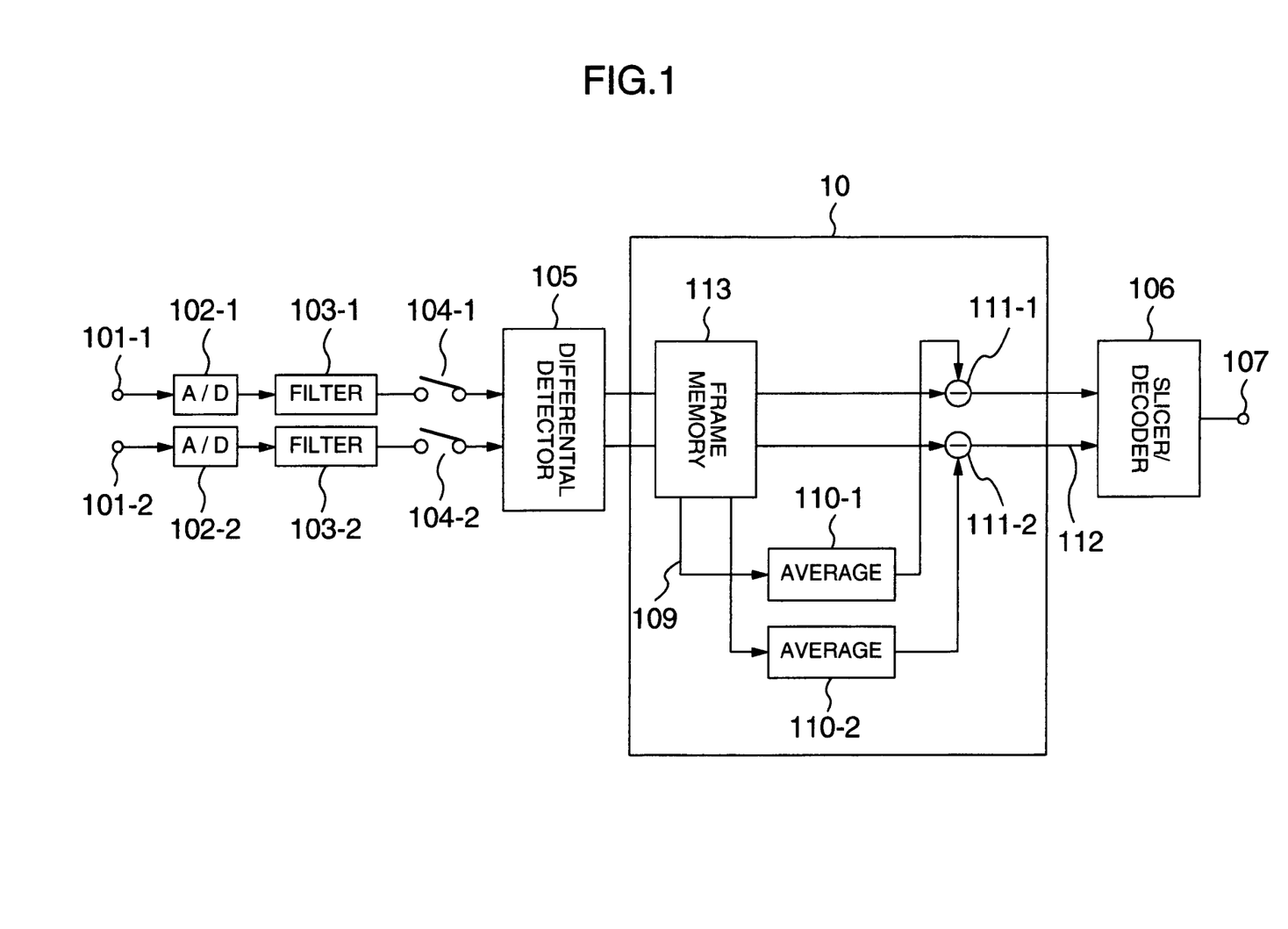
FIG. 1 is a block diagram of an embodiment of the present invention.

FIG. 1 is a block diagram of a structure of a demodulator of a differential detection system for π/4 shifted QPSK modulation wave in accordance with an embodiment of the present invention. In FIG. 1, reference symbols 101-1 and 101-2 denote input terminals for input of received signals, symbols 102-1 and 102-2 denote A/D converters, 103-1 and 103-2 denote filters, 104-1 and 104-2 denote samplers, 105 denotes a differential detector, 10 denotes a corrector for correcting a deviated distribution of signal points on a constellation, 106 denotes a slicer (decider)/decoder, and 107 denotes a output terminal for output of a decoded signal. The corrector 10 includes a frame memory 113, average calculators 110-1 and 110-2, and subtractors 111-1 and 111-2.

I (in-phase) and Q (quadrature) components of a received base-band converted signal which is an input signal of the demodulator are converted at the respective A/D converters 102-1 and 102-2 to digital signals. Thereafter, the digital signals are subjected at the filters 103-1 and 103-2 to removing operation of unnecessary components and to waveform shaping operation, and then subjected at the samplers 104-1 and 104-2 to extracting operation of symbol point signals. The symbol signals are subjected at the differential detector 105 to differential detecting operation and sequentially stored in the frame memory 113.

The average calculators 110-1 and 110-2 calculate averages of I and Q components of all data stored in the frame memory 113. Thereafter, data about the I component is sequentially read out from the frame memory 113, subtracted at the subtractor 111-1 by a result of the average calculator 110-1, and then applied to the slicer/decoder 106 as its I component input. Similarly, data about the Q component is sequentially read out from the frame memory 113, subtracted at the subtractor 111-2 by a result of the average calculator 110-2, and then applied to the slicer/decoder 106 as its Q component input. The slicer/decoder 106 decides signs of the I and Q input components, and outputs a corresponding bit train from the output terminal 107.

Figure 10:
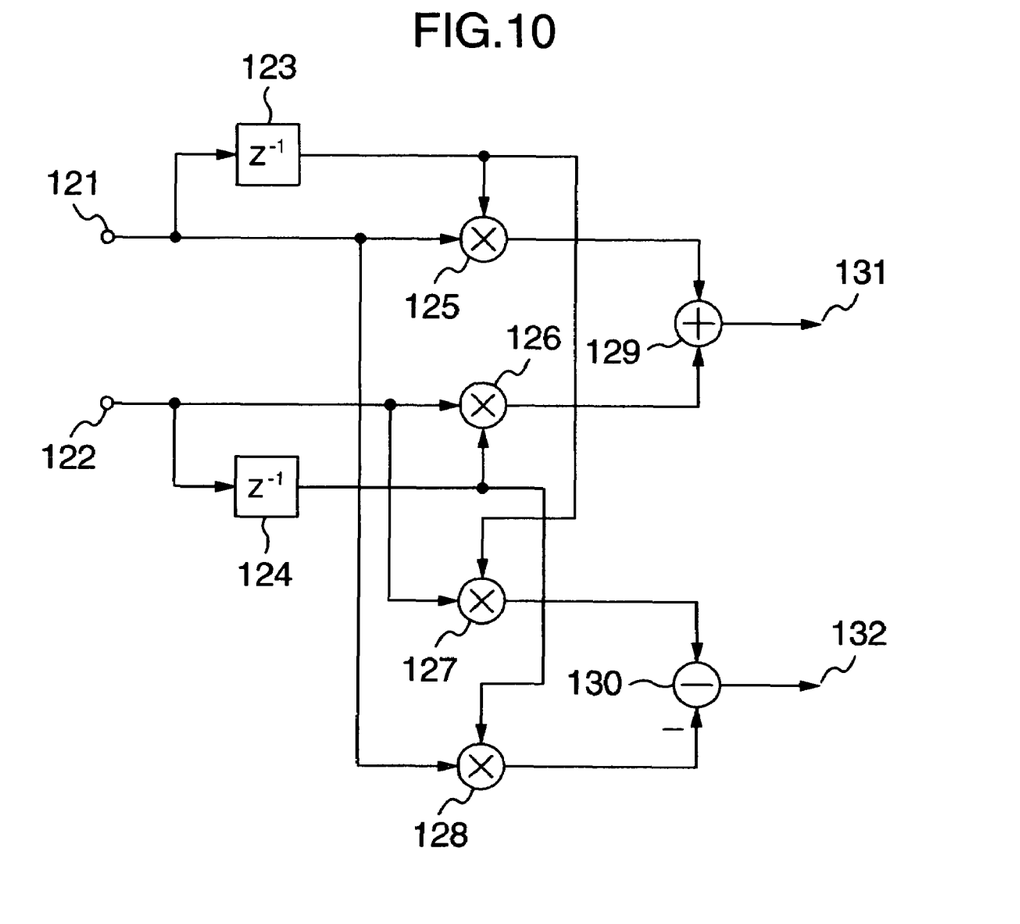
FIG. 10 is a block diagram showing a structure of the differential detector.

FIG. 10 shows a structure of the differential detector 105. By referring to FIG. 10, explanation will be made as to the structure and operation of the differential detector 105. In the drawing, reference numerals 121 and 122 denote I (in-phase) component input terminal and Q (quadrature) component input terminal, 123 and 124 denote registers for temporarily storing data therein, 125 to 128 denote multipliers, 129 denotes an adder, 130 denotes a subtractor, and 131 and 132 denote I (in-phase) I and Q (quadrature) component output terminals, respectively. With such an arrangement, when an input a(n) is applied to the I component input terminal 121 and b(n) is applied to the Q component output terminal 132 at a time n, an output c(n) from the I component output terminal 131 and an output d(n) from the Q component output terminal 132 are expressed by the following equations.

$$c(n)=a(n)a(n-1)+b(n)b(n-1)$$

$$d(n)=a(n-1)b(n)-a(n)b(n-1)$$

When the input signal is regarded as $X(n)=a(n)+jb(n)$ and the output signal is regarded as $Y(n)=c(n)+jd(n)$, the aforementioned arrangement is equivalent to the operation of the following equation, that is, to multiplying the input signal at the time n by the complex conjugate of the input signal at a time n−1.

$$Y(n)=\{a(n)a(n-1)+b(n)b(n-1)\}+j\{a(n-1)b(n)-a(n)b(n-1)\}=X(n)X^*(n-1)$$

A phase component arg(Y(n)) of an output signal Y(n) thus obtained means a phase change in the input signal X(n) during a time period from the time n−1 to the time n. In the π/4 shifted QPSK modulation system, information is converted to a phase change and then transmitted. The transmitted information can be decoded at the receiver side by obtaining the phase component arg(Y(n)) of the output Y(n) of the differential detector with the aforementioned arrangement.

Figure 11:
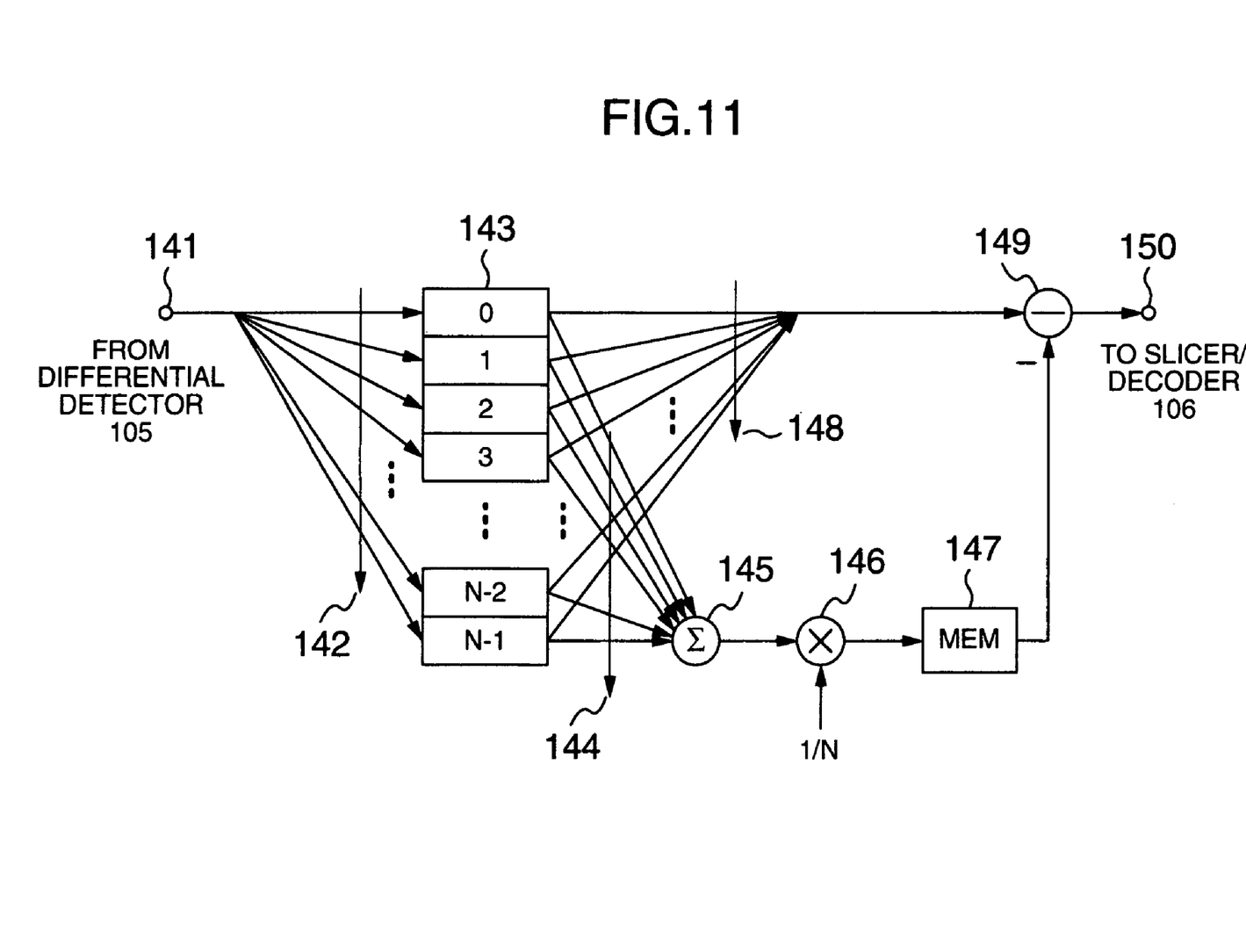
FIG. 11 is a block diagram of an exemplary structure of a corrector for correcting deviated distribution of signal points on a constellation in accordance with the present invention.

FIG. 11 shows an exemplary structure of the corrector 10. The structure and operation of the corrector 10 will be explained with reference to FIG. 11. FIG. 11 corresponds to the I component and the same holds true for the Q component.

In FIG. 11, the output of the differential detector is stored in the frame memory in such an order as shown by arrows 142 from an input terminal 141. In this case, it is assumed that the frame memory has a size of N. The output of the frame memory is added by an adder 145 in such an order as shown by an arrow 144 to obtain a sum of the data within the frame memory. The obtained sum is multiplied by 1/N by a multiplier 146. That is, the output of the multiplier 146 corresponds to an average value of the data in the frame memory, and the average value is temporarily stored in a memory 147. Finally, a subtractor 149 finds differences between the respective pieces of data in the frame memory and the average value stored in the memory 147 are found in such an order as shown by reference numeral 148 and outputs the differences sequentially to the slicer/decoder 106 from an output terminal 150. The operation carried out with such an arrangement can be expressed by an equation which follows.

$$y(n) = x(n) - \frac{1}{N}\sum_{i=0}^{N-1} x(i)$$

Wherein, x(n) is an input, y(n) is an output, and N is an integer of 2 or more.

Figure 2:
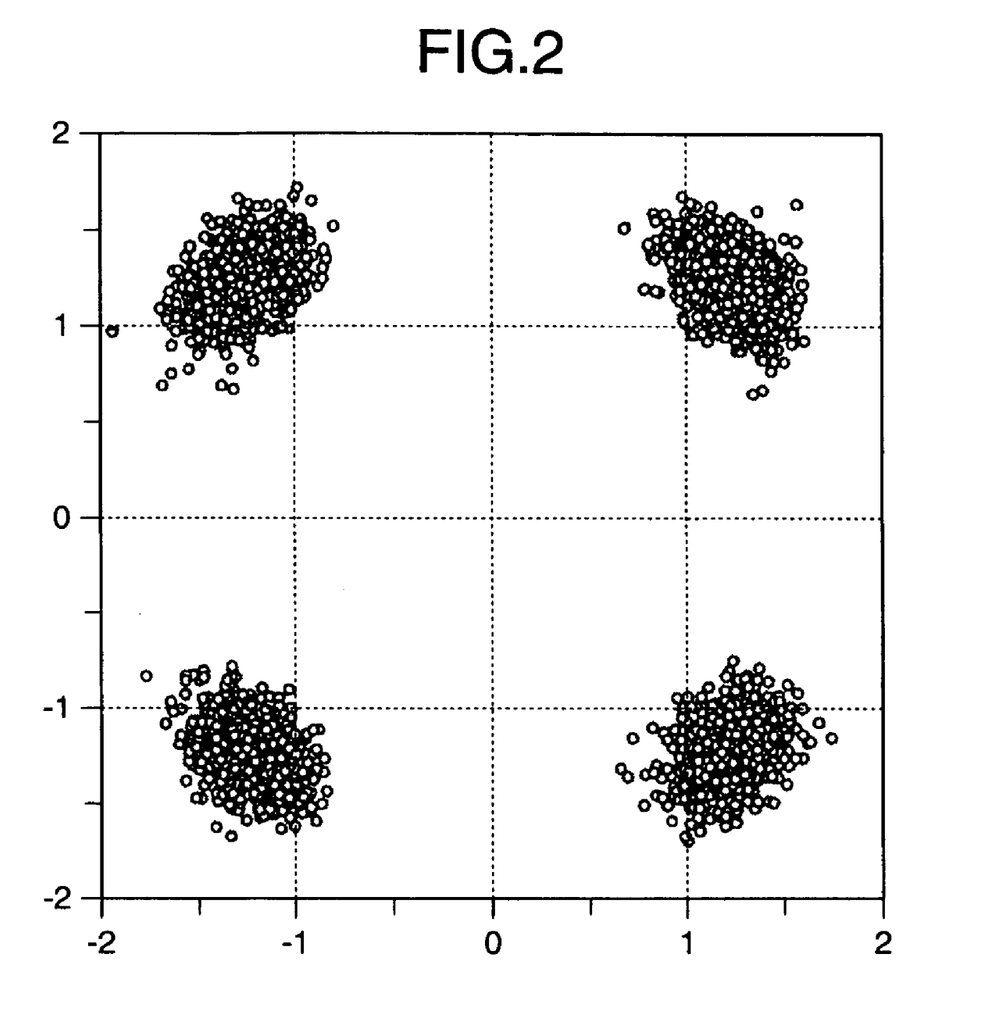
FIG. 2 is a constellation showing outputs of a differential detector when no delay spread is present.
Figure 3:
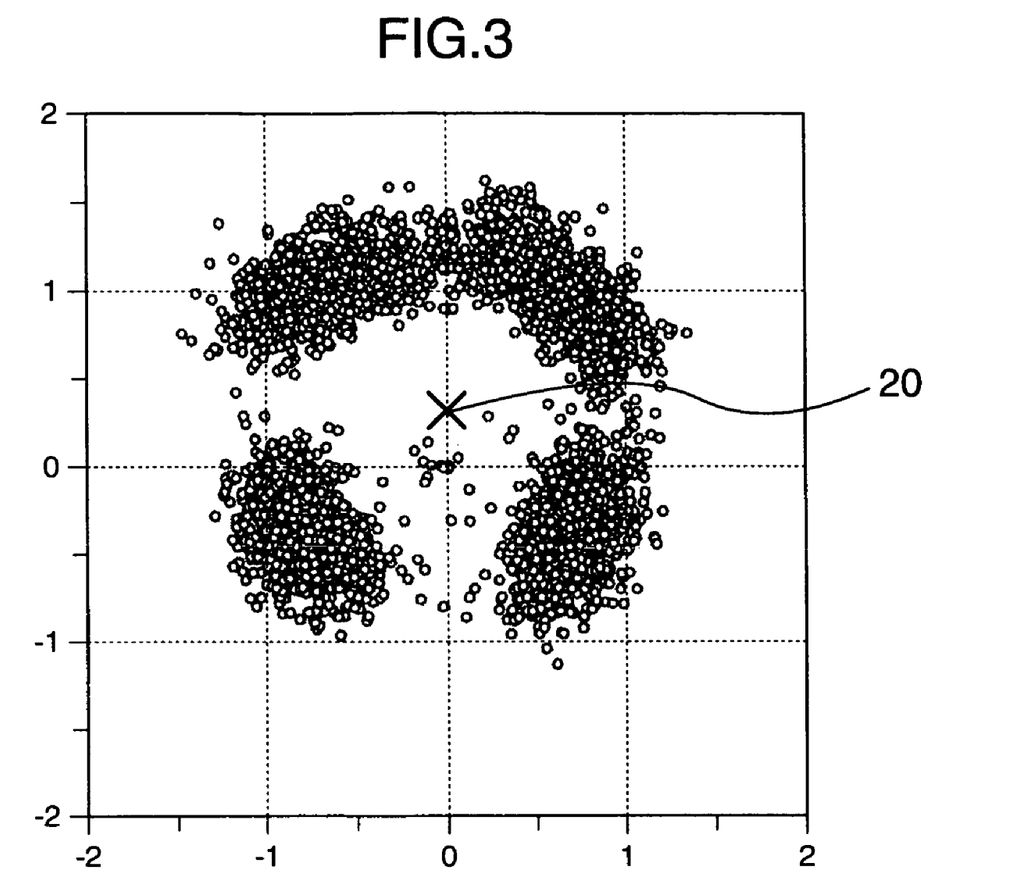
FIG. 3 is a constellation showing exemplary outputs of the differential detector when a delay spread is present.
Figure 4:
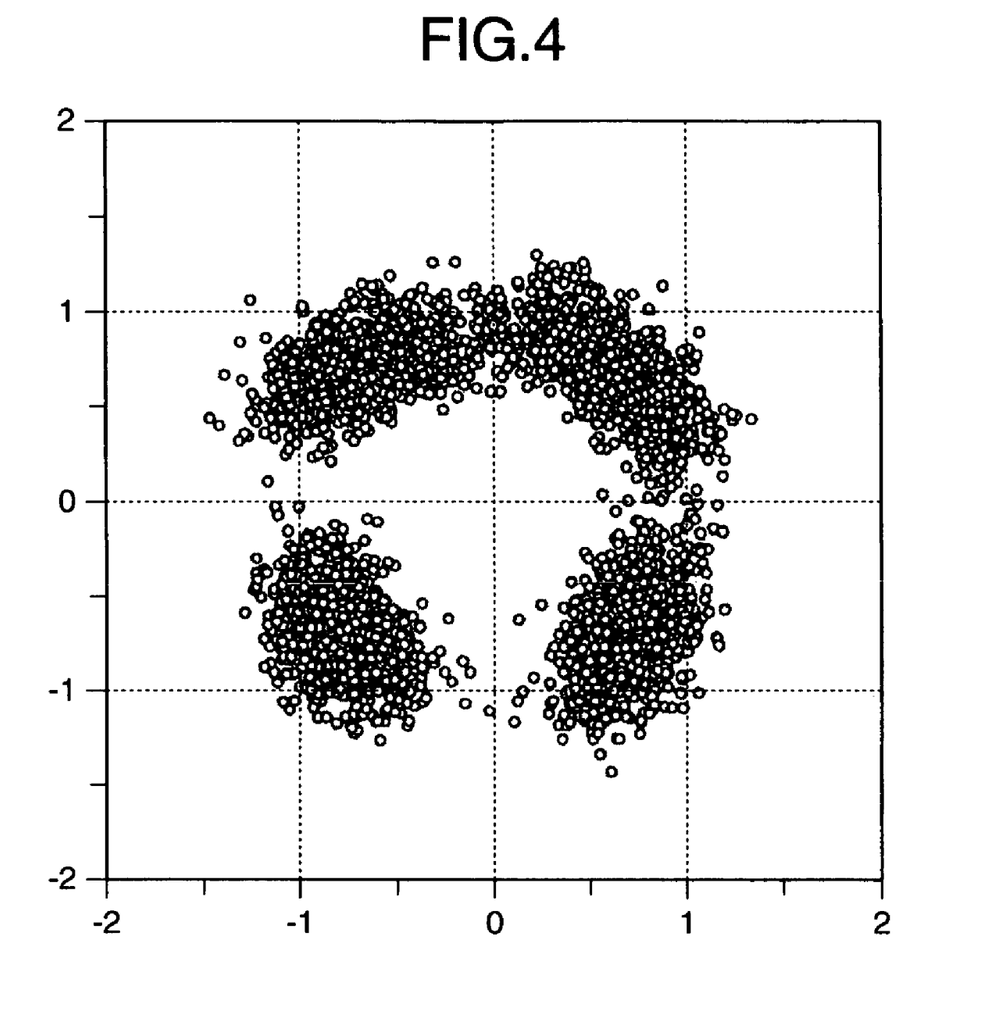
FIG. 4 is a constellation showing exemplary outputs of the differential detector when the present invention is applied to the outputs of the differential detector of FIG. 3.

The operation and effects of the present invention will be explained with reference to FIGS. 2, 3 and 4. These drawings were obtained by simulation. The conditions of a propagation path of FIG. 2 is based on only the direct wave. In FIGS. 3 and 4, two waves of the direct and delayed waves exist, and the delayed wave is assumed to have a power of −3 dB, a delay of ¼ symbol and a phase difference of 135 degrees. In any of these drawings, an average C/N of a combination of the direct and delayed waves is set at 15 dB.

FIGS. 2 and 3 each show a constellation output before decision in the prior art, which corresponds to the output of the differential detector 105 and also to data stored in the frame memory 113. In FIG. 2, since no delayed wave is present, a spread of signal points is caused by noise and no bit error is generated. In this case, the signal point spread keeps a symmetry with respect to an origin. In FIG. 3, on the other hand, since a delayed wave is present, signal points exceeding decision boundaries are present, thus generating a bit error. In this example, a bit error rate is about $2.0 \times 10^{-2}$. It will be easily observed in FIG. 3 that the bit errors are caused not only by the signal point spread but also by the fact that the signal points are deviatedly distributed generally toward the upper side. In this way, when compared with a bit error caused by noise, the bit errors caused by the delay spread generally include many bit errors caused by deviated distribution of signal points. Reference numeral 20 in FIG. 3 denotes a point which indicates an average value of all signal points on the frame memory 113 and also indicates a degree of the deviated distribution. This corresponds to the outputs of the average calculators 110-1 and 110-2. When the average value 20 is subtracted from all the signal points to remove deviatedly distributed components, it can be expected to reduce the bit error. To this end, in the present invention, the substractors 110-1 and 110-2 perform such subtracting operation to use their outputs for decision and decoding. A constellation of the outputs of the subtractors 111-1 and 111-2, that is, the waveform of a signal 112 in FIG. 1 is shown in FIG. 4. It will be seen from FIG. 4 that the deviated distribution of signal points seen in FIG. 3 is removed. At this time, a bit error rate is about $4.6 \times 10^{-3}$, that is 1/5 of a bit error rate in the prior art, that is, the bit error rate is improved up to 1/5.

Figure 12:
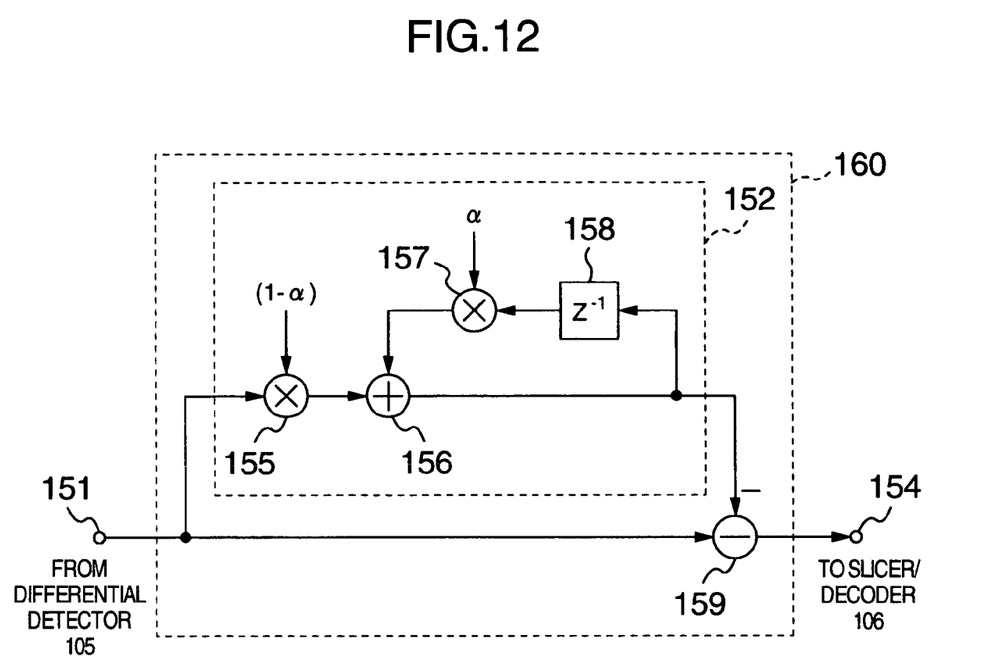
FIG. 12 is a block diagram of another exemplary structure of the corrector.

FIG. 12 shows another exemplary structure of the corrector 10.

In the aforementioned corrector of FIG. 11, the frame memory is used to store data and a delay in frame units takes place between the input and output. In order to avoid such a delay, however, it is also possible to arrange the corrector without storing data, which will be explained by referring to FIG. 12. An output of the differential detector 105 is applied to an input terminal 151. A block to find an average value of input values is denoted by a dotted-line frame 152. An output of the dotted-line frame 152 is subtracted by a subtractor 159 from the input value and the remaining valve is outputted from a terminal 154. In the block of the dotted-line frame 152, the input value is first multiplied by a multiplier 155 by a constant (1−α), an output of a register 158 is multiplied by a multiplier 157 by a constant α, and outputs of the multipliers 155 and 157 are added together by an adder 156. The added result is an output of the block 152 and is stored in the register 158. The block 152 is arranged so that past inputs are weighted and added to find an average value of the past input data. The constant α is set to satisfy a relation 0<α<1, which means that the larger the constant is, an average of more older data is calculated. A block shown by a dotted-line frame 160 is for the I component of the output of the differential detector, and it is similarly necessary to provide a block for the Q component. With the aforementioned arrangement, the present invention can be implemented without storing data.

As has been explained in the foregoing, in accordance with the above embodiment, the influences of the delay spread can be advantageously suppressed without using a complicated adaptive equalizer.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A demodulator of a differential detection system for a π/4 shifted Quadrature Phase Shift Keying (QPSK) or Differential Quadrature Phase Shift Keying (DQPSK) modulation wave in digital communication, comprising:

a plurality of differential detectors each connected to receive an orthogonal component of said modulation wave;

a corrector connected to receive outputs of said differential detectors for correcting a deviated distribution of signal points on a constellation; and a slicer/decoder connected to receive outputs of said corrector, wherein said slicer/decoder decodes a received bit from the signal points after the deviated distribution thereof is corrected, and wherein said corrector has a plurality of average calculators each connected to receive an output of a respective one of the differential detectors and a plurality of subtractors each connected to receive an output of a respective one of the differential detectors and also receive an associated one of outputs of the average calculators for subtracting an average value of the output of the differential detector from the output of the differential detector.

2. The demodulator as set forth in claim 1, wherein said average calculators each include a memory for storing N pieces of output data of said differential detector, an adder for adding together said N pieces of output data read out from the memory, and a multiplier for outputting an output corresponding to 1/N of its input, N being an integer of 2 or more.

3. The demodulator as set forth in claim 1, wherein said average calculators each include a first multiplier for multiplying output data of said differential detector by a constant $(1-\alpha)$, a register, a second multiplier for multiplying data from the register by a constant $\alpha$, and an adder for adding together outputs of said first and second multipliers and storing the outputs which have been added together by the adder in said register, wherein an output of said adder is an average value of the output data of the differential detector and the constant $\alpha$ is set to satisfy a relationship $0<\alpha<1$.

4. A demodulation method based on a differential detection system for a $\pi/4$ shifted Quadrature Phase Signal Keying (QPSK) modulation wave in digital communication, comprising the steps of:

differential detecting said modulation wave by a differential detector;

correcting a deviated distribution of signal points of said differential-detected modulation wave on a constellation; and decoding a received bit from the corrected signal points by a slicer/decoder, wherein said correcting step comprises the steps of:

calculating an average value of the signal points of said differential-detected modulation wave, and subtracting said average value from each of the signal points of said differential-detected modulation wave, wherein said slicer/decoder decodes a received bit from said signal points of said modulation wave after the average value is subtracted.

* * * * *